(12) United States Patent
Hanada

(10) Patent No.: US 7,876,469 B2
(45) Date of Patent: Jan. 25, 2011

(54) IMAGE FORMING APPARATUS AND UPDATING METHOD

(75) Inventor: Takashi Hanada, Tochigi (JP)

(73) Assignee: Panasonic Corporation, Osaka (JP)

( * ) Notice: Subject to any disclaimer, the term of this patent is extended or adjusted under 35 U.S.C. 154(b) by 1194 days.

(21) Appl. No.: 11/006,657

(22) Filed: Dec. 8, 2004

(65) Prior Publication Data

US 2005/0141025 A1   Jun. 30, 2005

(30) Foreign Application Priority Data

Dec. 26, 2003   (JP) .............................. P2003-432696
Sep. 3, 2004   (JP) .............................. P2004-257606

(51) Int. Cl.
*G06K 15/00* (2006.01)

(52) U.S. Cl. ..................... 358/1.16; 358/1.15; 358/1.13; 717/168; 717/174; 711/2; 713/100

(58) Field of Classification Search .................. 358/1.9, 358/1.13, 1.15, 1.16; 713/2; 717/168, 174; 711/100

See application file for complete search history.

(56) References Cited

U.S. PATENT DOCUMENTS

| | | | |
|---|---|---|---|
| 5,802,365 A * | 9/1998 | Kathail et al. ............... | 719/321 |
| 6,263,378 B1 * | 7/2001 | Rudoff et al. ............... | 719/327 |
| 6,675,258 B1 * | 1/2004 | Bramhall et al. ............. | 711/114 |
| 6,832,373 B2 * | 12/2004 | O'Neill ....................... | 717/171 |
| 7,043,166 B2 * | 5/2006 | Parry et al. .................... | 399/12 |
| 7,380,243 B2 * | 5/2008 | Sugishita et al. ............. | 717/168 |
| 2003/0086107 A1 * | 5/2003 | Johnson et al. ............. | 358/1.13 |
| 2005/0018212 A1 * | 1/2005 | Christensen ................ | 358/1.1 |

FOREIGN PATENT DOCUMENTS

JP   2003-072197   3/2003

OTHER PUBLICATIONS

English Language Abstract of JP 2003-072197.

* cited by examiner

*Primary Examiner*—David K Moore
*Assistant Examiner*—Vu B Hang
(74) *Attorney, Agent, or Firm*—Greenblum & Bernstein P.L.C.

(57) ABSTRACT

An image forming apparatus comprises an interface which can communicate with the information processing apparatus that serves as the source of updating firmware. The image forming apparatus further comprises a memory which stores a plurality of firmware programs and a controller which performs firmware updates by sequentially storing the updating firmware transferred from the information processing apparatus. When a plurality of firmware programs are transferred from the information processing apparatus, the controller performs a reboot operation to activate the updated firmware upon completing the storage and the rewriting of the updating firmware in the memory.

18 Claims, 11 Drawing Sheets

Fig.2

| Firmware Identifiers | Firmware names |
|---|---|
| 1 | Standard firmware |
| 2-1 | PCL firmware |
| 2-2 | PCL firmware for PCL control |
| 2-3 | PCL firmware for PCL fonts |
| 3-1 | PS/PCL firmware |
| 3-2 | PS/PCL firmware for PCL contorol |
| 3-3 | PS/PCL firmware for PCL fonts |
| 4 | Scanner firmware |
| . | . |
| . | . |
| . | . |

Fig.7

| File names | Firmware | Transfer location |
|---|---|---|
| 001 | Standard firmware | FROM |
| 002 | PCL optional firmware | FROM |
| 003 | PCL optional firmware (PCL control) | Extended FROM |
| 004 | PCL optional firmware (PCL fonts) | Extended FROM |
| 010 | FAX option board firmware | FAX option circuit board |

IMAGE FORMING APPARATUS AND UPDATING METHOD

BACKGROUND OF THE INVENTION

1. Field of the Invention

The present invention relates to an image forming apparatus, such as a facsimile apparatus and a multifunction apparatus, which stores a plurality of firmware programs, and to an updating method for updating firmware stored in such an apparatus. The present invention also relates to a portable memory which stores firmware for the image forming apparatus.

2. Description of Related Art

When firmware stored in an image forming apparatus (control program) are updated, the image forming apparatus obtains firmware from a host computer and performs a firmware rewriting process. After the rewriting process is completed, the image forming apparatus is automatically rebooted. Then, the image forming apparatus performs operations based on the updated firmware.

For example, the image forming apparatus comprises a memory which stores rewritable firmware. The image forming apparatus can rewrite the firmware written in the memory with updating firmware received from the host computer ("updating firmware" means a new version of firmware that replaces an old version of the same firmware). The image forming apparatus comprises a decision unit which determines whether the image forming apparatus is in operation or not, when the host computer sends an order to rewrite the firmware. The image forming apparatus also comprises a storage unit which temporarily stores the updating firmware, when the decision unit determines that the image forming apparatus is in operation (See Related Art 1 for example). According to Related Art 1, when the decision unit determines that the image forming apparatus is in operation, the image forming apparatus can receive and rewrite the firmware in separate operations. Therefore, the image forming apparatus can receive the firmware from the host computer, without depending on whether the image forming apparatus is in operation or not.

[Related Art 1]

Japanese Laid-open Patent Publication No. 2003-72197

However, the technology described in the above-referred Related Art 1 requires a process to rewrite the firmware each time a necessary firmware update is obtained. Then, each time the rewriting process is executed, the image forming apparatus needs to be rebooted so as to activate the rewritten firmware. Therefore, when a plurality of firmware programs are updated, the updating process and the rebooting process must be repeated as many times as the number of firmware programs which need to be updated. This results in an inefficient updating process.

Furthermore, in order to update the firmware stored in the image forming apparatus, an operator needs to prepare the host computer which stores updating firmware and needs to connect the host computer to the image forming apparatus. Therefore, it has been cumbersome for the operator to update firmware.

Furthermore, the firmware stored in the image forming apparatus not only include standard functions but may also have optional functions which can be randomly chosen. In this case, in order to update the firmware, the operator needs to specify necessary updating firmware which need to be updated according to the functions currently stored in the image forming apparatus.

SUMMARY OF THE INVENTION

The present invention is provided to solve the above-described problems of a conventional technology. The primary purpose of the present invention is to provide an image forming apparatus which can perform necessary firmware updates in an easier and more efficient way according to the stored functions, and to provide a portable memory which stores the firmware for the image forming apparatus.

To achieve the above-described purposes, the image forming apparatus of the present invention comprises interface which can communicate with an information processing apparatus which serves as the source of updating firmware. The image forming apparatus further comprises memory which stores a plurality of firmware programs and controller which sequentially stores the updating firmware transferred from the information processing apparatus in the memory and performs the firmware update. When a plurality of updating firmware are transferred from the information processing apparatus, the controller is configured to reboot the image forming apparatus to activate the updated firmware, after all of the plurality of updating firmware are completely stored and rewritten in the memory.

The image forming apparatus of the present invention does not need to repeat the rewrite-and-reboot process, when a plurality of firmware programs are updated. Therefore, the image forming apparatus can make it possible to update the firmware in an easier and more efficient way.

In addition, the image forming apparatus of the present invention comprises a memory which stores a plurality of firmware programs and a controller which updates the firmware stored in the memory as needed. The image forming apparatus further comprises an interface which connects a portable memory to the image forming apparatus. When the firmware is updated, the controller selects updating firmware applicable to the image forming apparatus among a plurality of firmware programs stored in the portable memory which is connected to the image forming apparatus via the interface. After the selected updating firmware are completely transferred to, stored and rewritten in the memory, the controller reboots the image forming apparatus to activate the updated firmware.

Therefore, the image forming apparatus of the present invention can update the firmware which needs to be updated more efficiently with easier operations according to the functions stored in the apparatus. Applicable updating firmware is selected, for instance, by comparing the information regarding a plurality of firmware programs stored in the memory with the information regarding the updating firmware.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 2 is a chart illustrating an example of the updating firmware used for the image forming apparatus according to the first embodiment of the present invention;

FIG. 7 is a chart illustrating an example of updating firmware stored in the memory card inserted to the image forming apparatus shown in FIG. 6;

DETAILED DESCRIPTION OF PREFERRED EMBODIMENTS

The embodiments of the present invention are explained in the following, in reference to the below-described drawings.

First Embodiment

Figure 1:
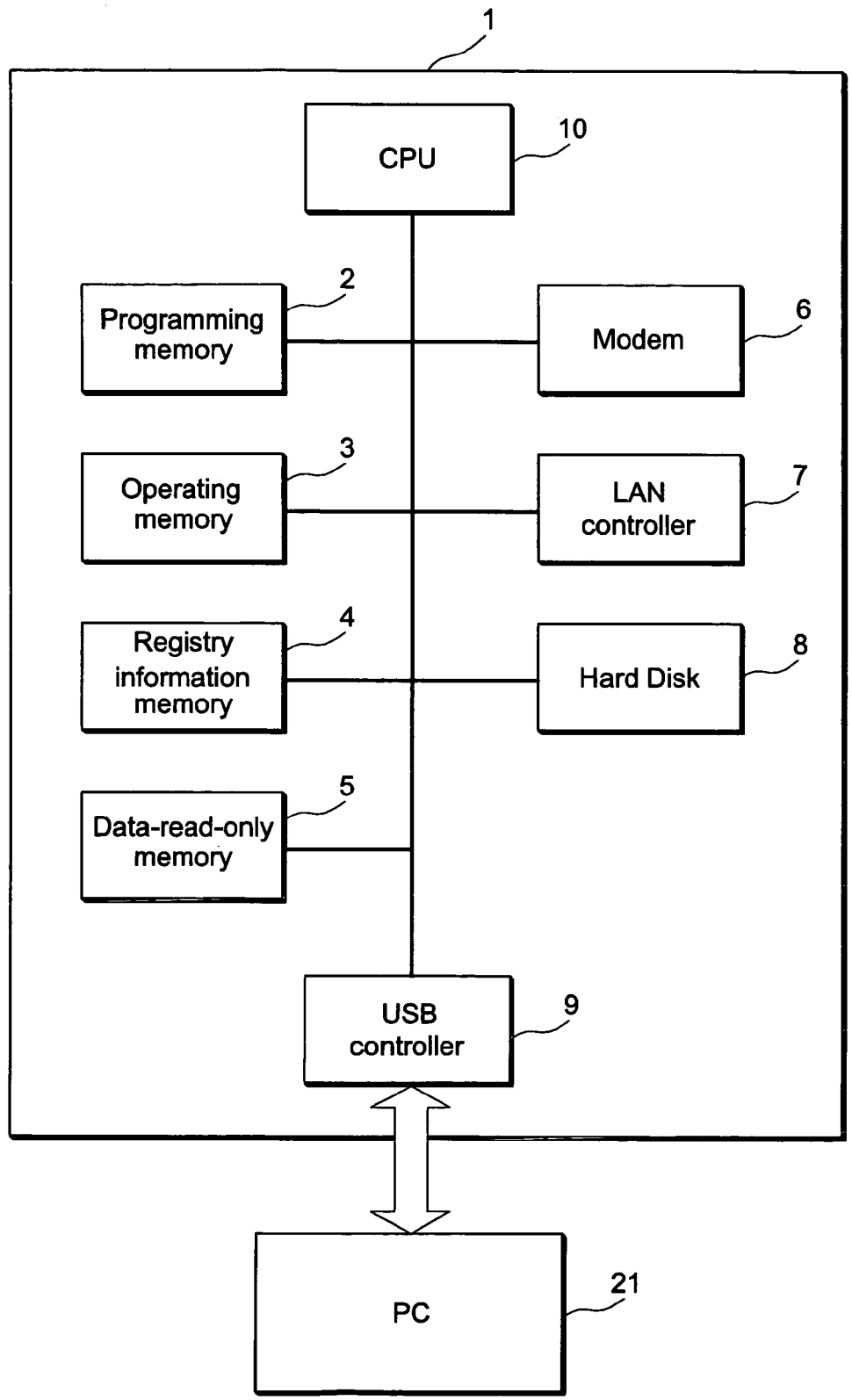
FIG. 1 is a block diagram illustrating a configuration of the image forming apparatus according to the first embodiment of the present invention.

FIG. 1 is a block diagram illustrating a configuration of the image forming apparatus of the present invention. The image forming apparatus 1 comprises: programming memory (memory) 2; operating memory 3; registry information memory 4; data read-only memory 5; modem 6; LAN controller 7; hard disk 8; USB (Universal Serial Bus) controller (interface) 9; and CPU (Central Processing Unit) (controller) 10.

Programming memory 2 comprises a non-volatile memory (e.g., Flash ROM), and stores a plurality of firmware programs for respective control modules. Operating memory 3 comprises a volatile memory (e.g., DRAM), and has a domain where the firmware and other information stored in programming memory 2 are performed. Operating memory 3 also has a domain to temporarily store the updating firmware, when the firmware is updated. Registry information memory 4 comprises a non-volatile memory, and stores various registry information including firmware identifiers and firmware update dates. Data-read-only memory 5 is a Mask ROM to which such programs as firmware are written in advance. Data-read-only memory 5 functions as a spare memory in case troubles occur such as write-in errors of the firmware stored in programming memory 2. Hard disk 8 can store various data of each program and image data handled on image forming apparatus 1.

Modem 6 communicates with other apparatuses through public telecommunications by converting digital signals to analog signals and converting analog signals to digital signals. LAN controller 7 controls the network connection with the LAN.

USB controller 9 controls USB communications with PC (information processing apparatus) 21 which serves as the source of the updating firmware. PC 21 stores a database management system and controls a plurality of updating firmware programs used for image forming apparatus 1. Connection between image forming apparatus 1 and PC 21 is not necessarily limited to the above-described USB connection. Any connection is possible as long as it can transfer the updating firmware data from PC 21 to image forming apparatus 1. For example, it is also possible to make a connection through public communications via modem or through the LAN network via LAN controller, or through the Internet.

CPU 10 comprehensively controls the operations of the above-described components 2-9 contained in image forming apparatus 1. When the firmware is updated, CPU 10 sequentially stores the updating firmware transferred from PC 21 to programming memory 2, and CPU 10 executes the firmware update.

Although detailed embodiments are not explained here, image forming apparatus 1 can be realized as a multifunction apparatus having functions as a facsimile apparatus, a copy apparatus, a scanner apparatus, and a printer apparatus, etc.

FIG. 2 is a chart illustrating an example of the updating firmware used for image forming apparatus 1 of the present invention. In this example, image forming apparatus 1 has printer functions, and the updating firmware for such a printer apparatus is explained. As shown in FIG. 2, three kinds of identifiers are provided as the updating firmware for the printer apparatus (e.g., Identifier 1, Identifiers 2-1~2-3 and Identifiers 3-1~3-3), and these identifiers are stored in PC 21. In this example, Identifier 1 is a standard firmware set for a printer apparatus. Identifiers 2-1~2-3 are sets of firmware for a printer apparatus which supports PCL (Printer Command Language). Identifiers 3-1~3-3 are sets of firmware for a printer apparatus which supports both PS (Post Script) and PCL.

Updating firmware programs are identified by the above-described identifiers and file names. The appropriate firmware is specified and transferred to image forming apparatus 1. Therefore, when the firmware for a printer apparatus is updated, one of the three updating firmware programs is specified. Usually, these updating firmware programs are created as binary files. These updating firmware programs can also be stored in PC 21 as compressed files. In this case, the specified firmware can be decompressed and used after being transferred to image forming apparatus 1.

Figure 3:
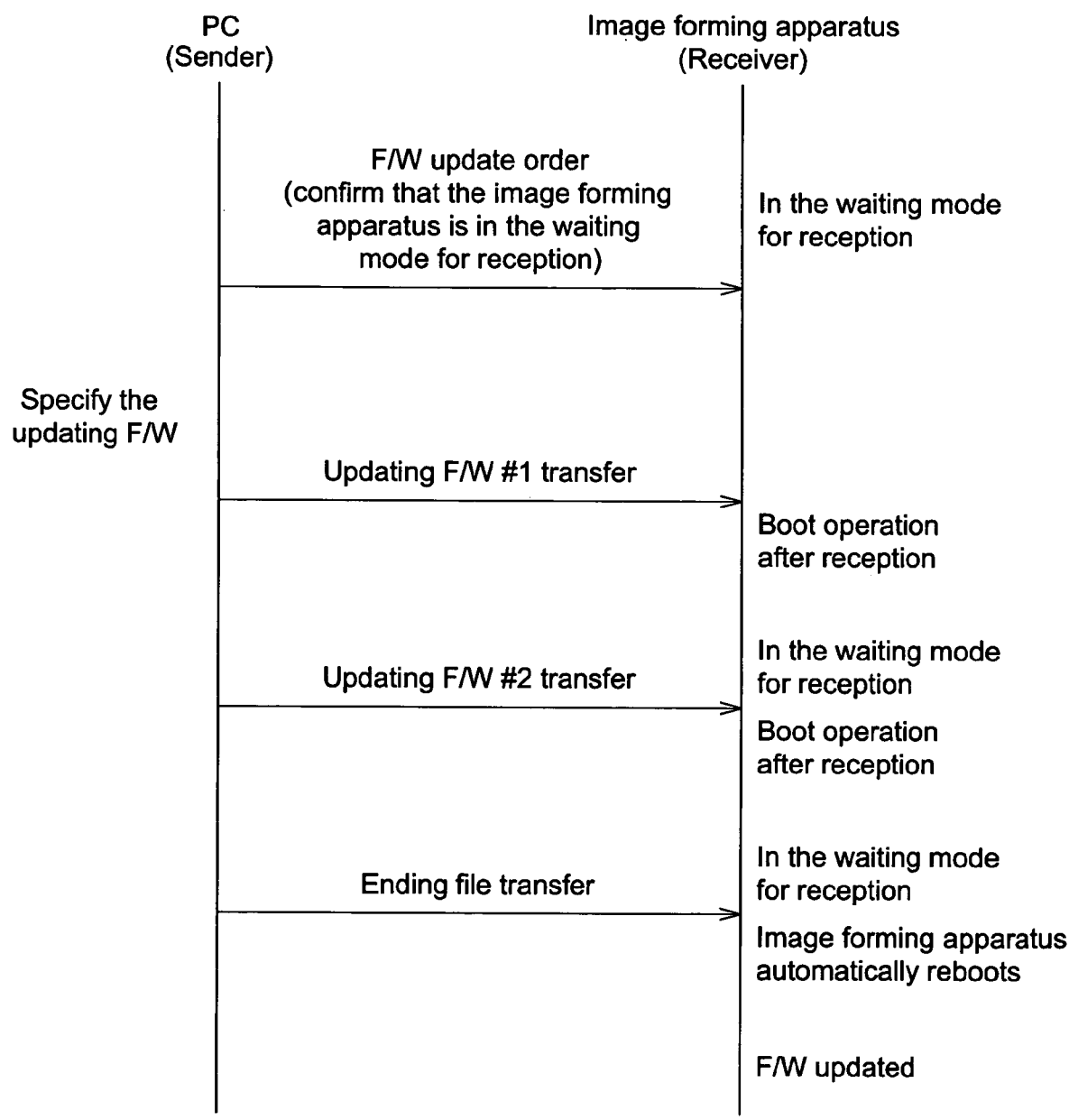
FIG. 3 is a sequence chart illustrating a basic communication process between the image forming apparatus and PC shown in FIG. 1, when the firmware is updated.

FIG. 3 is a sequence chart illustrating a basic communication process between the image forming apparatus and PC shown in FIG. 1, when the firmware is updated. In this example, PC 21 sends an update order to image forming apparatus 1, when the firmware (F/W) update becomes necessary for image forming apparatus 1.

When PC 21 confirms that image forming apparatus 1 is set to the waiting mode for reception (of the updating firmware), PC 21 specifies the appropriate updating firmware (in this example, updating firmware #1 and updating firmware #2) and transfers updating firmware #1 to image forming apparatus 1. When image forming apparatus 1 completes reception of updating firmware #1, image forming apparatus 1 performs a boot operation (updating firmware #1 is transferred from a predetermined area of operating memory 3 to programming memory 2, and is stored in programming memory 2) and returns to the waiting mode for reception.

Then, PC 21 transfers updating firmware #2 to image forming apparatus 1. Image forming apparatus 1 performs a boot operation and returns to the waiting mode after completing reception of updating firmware #2.

After all update transfers to image forming apparatus 1 are completed, PC 21 sends an ending file to inform image forming apparatus 1 of the completion of the updating firmware transfers. A text file with a letter string "FINISH", for example, can be used as the ending file. Based on ASCII (American Standard Code for Information Interchange) code, image forming apparatus 1 can identify the letter string of the received text file. Image forming apparatus 1 then can recognize that the firmware transfers are complete. A control program describing a predetermined process can also be used as the ending file.

When image forming apparatus 1 receives the ending file, CPU 10 performs an automatic reboot operation. Then, the updating firmware is performed in a designated area of operating memory 3. This process activates newly updated firmware, and completes the firmware update process.

The series of operations described above are set to start upon receiving the firmware update order from PC 21. However, other setups are also possible. For example, the image forming apparatus can be set to start the series of operations upon determining that necessary updating firmware exist after checking whether or not such firmware is stored in PC 21, the source of the updating firmware. In that case, the checking process is set to start when moment the image forming apparatus goes into the waiting mode.

Figure 4:
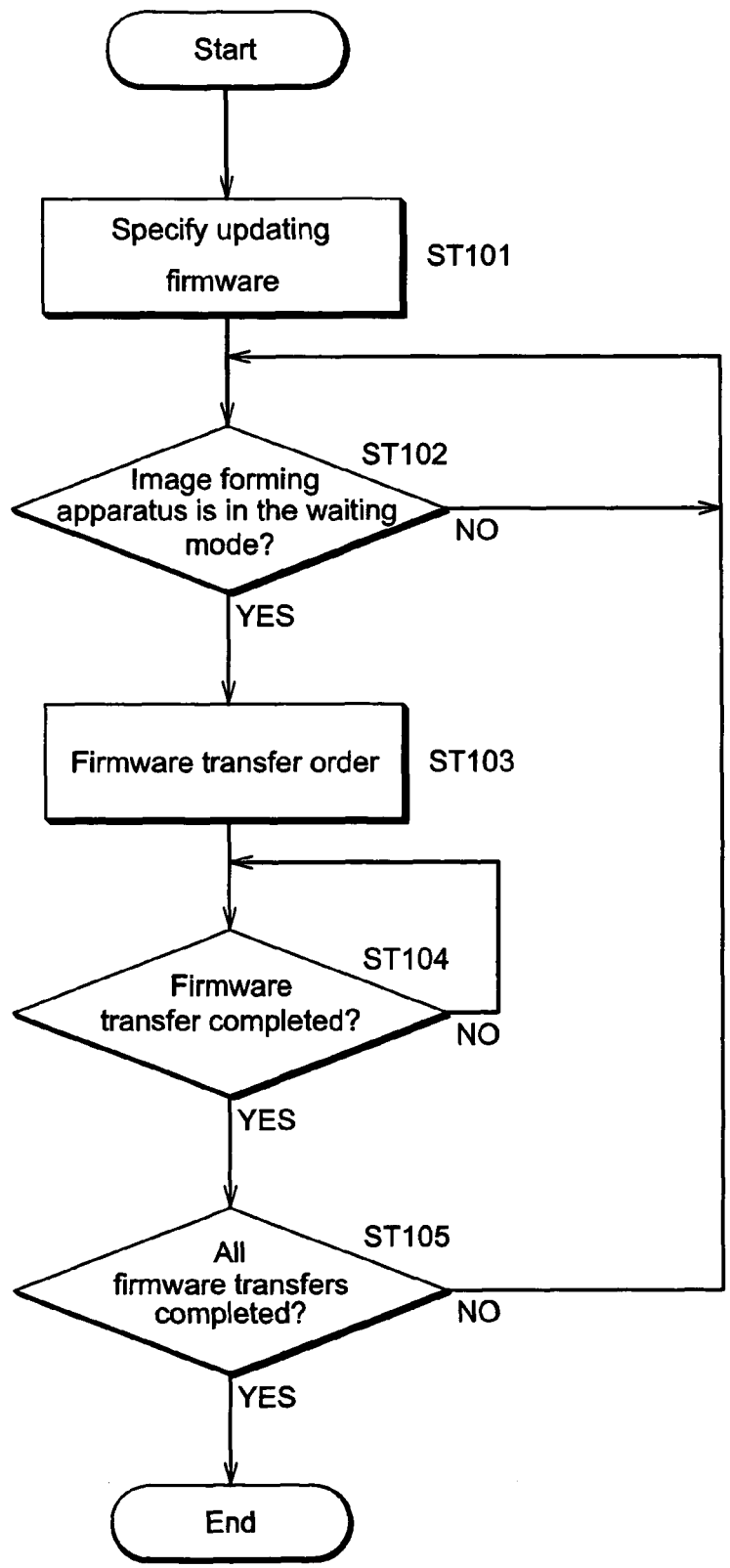
FIG. 4 is a flowchart illustrating a process performed on PC, when the firmware is updated.

FIG. 4 is a flowchart illustrating a process performed on the PC side, when the firmware is updated. When the firmware update start, appropriate firmware programs (in this example, they are a plurality of programs) are specified from the stored updating firmware (F/W) (ST 101). Then, the image forming apparatus is confirmed to be in the waiting mode for reception of the updating firmware (ST 102), and an order is sent to PC 21 spooler to transfer each updating firmware (ST 103). When one firmware transfer is completed according to the transfer order (ST 104), it is determined whether all transfers for the specified firmware in advance have been completed (ST 105). The above-described processes (ST 102-ST 104) are repeated until all updating firmware transfers are completed. Finally, PC 21 ends its operation after all updating firmware transfers are completed.

Figure 5:
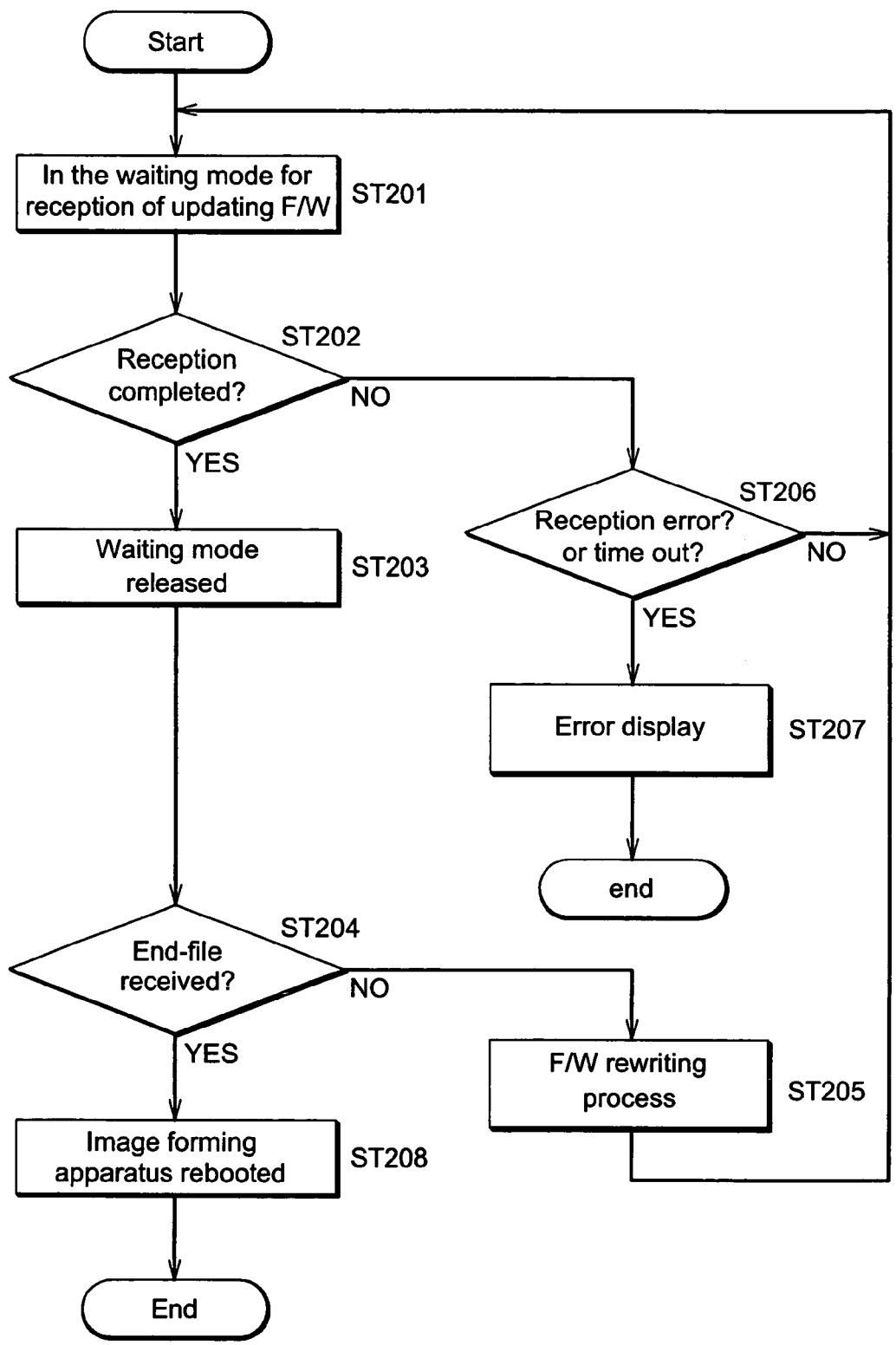
FIG. 5 is a flowchart illustrating a process performed on the image forming apparatus, when the firmware is updated.

FIG. 5 is a flowchart illustrating a process performed on the image forming apparatus, when the firmware is updated. When the firmware update starts, image forming apparatus 1 is set to the waiting mode for reception of the updating firmware (ST 201). Then, it is determined whether image forming apparatus 1 has completed reception of one updating firmware from PC 21 (ST 202). The waiting mode is released, after reception of one updating firmware is completed (ST 203). When the ending file has not been received (ST 204), the received updating firmware is transferred to and rewritten in programming memory 2 (ST 205). Image forming apparatus 1 then returns to the waiting mode (ST 201).

Meanwhile, if reception of the updating firmware has not been completed at ST 202, it is determined whether a reception error or a time out has occurred (ST 206). A reception error occurs, when there is a communication failure with PC 21 which serves as the source of the updating firmware. A time out occurs, when reception of the updating firmware continues to be incomplete over a predetermined time frame. When it is determined that a reception error or a time out has occurred at ST 206, an error signal appears on the display of the operation panel of image forming apparatus 1 (ST 207). As a result, image forming apparatus 1 abnormally terminates the process.

When the ending file is finally received at ST 204, the image forming apparatus is automatically rebooted, completing the firmware update (ST 208). As a result, image forming apparatus 1 normally terminates the process.

For example, the information processing apparatus which serves as the source of the updating firmware is not limited to the kind of the PC exemplified above. Various configurations are possible as long as the information processing apparatus has a predetermined database function to store the above-described updating firmware and has a communication function to exchange data with the image forming apparatus of the present invention. Furthermore, the updating firmware may not only be applicable to the components which the image forming apparatus currently comprises, but may also be applicable to optional components that may be added to the image forming apparatus later.

Second Embodiment

The second embodiment of the present invention is explained as follows, in reference to the drawings.

Figure 6:
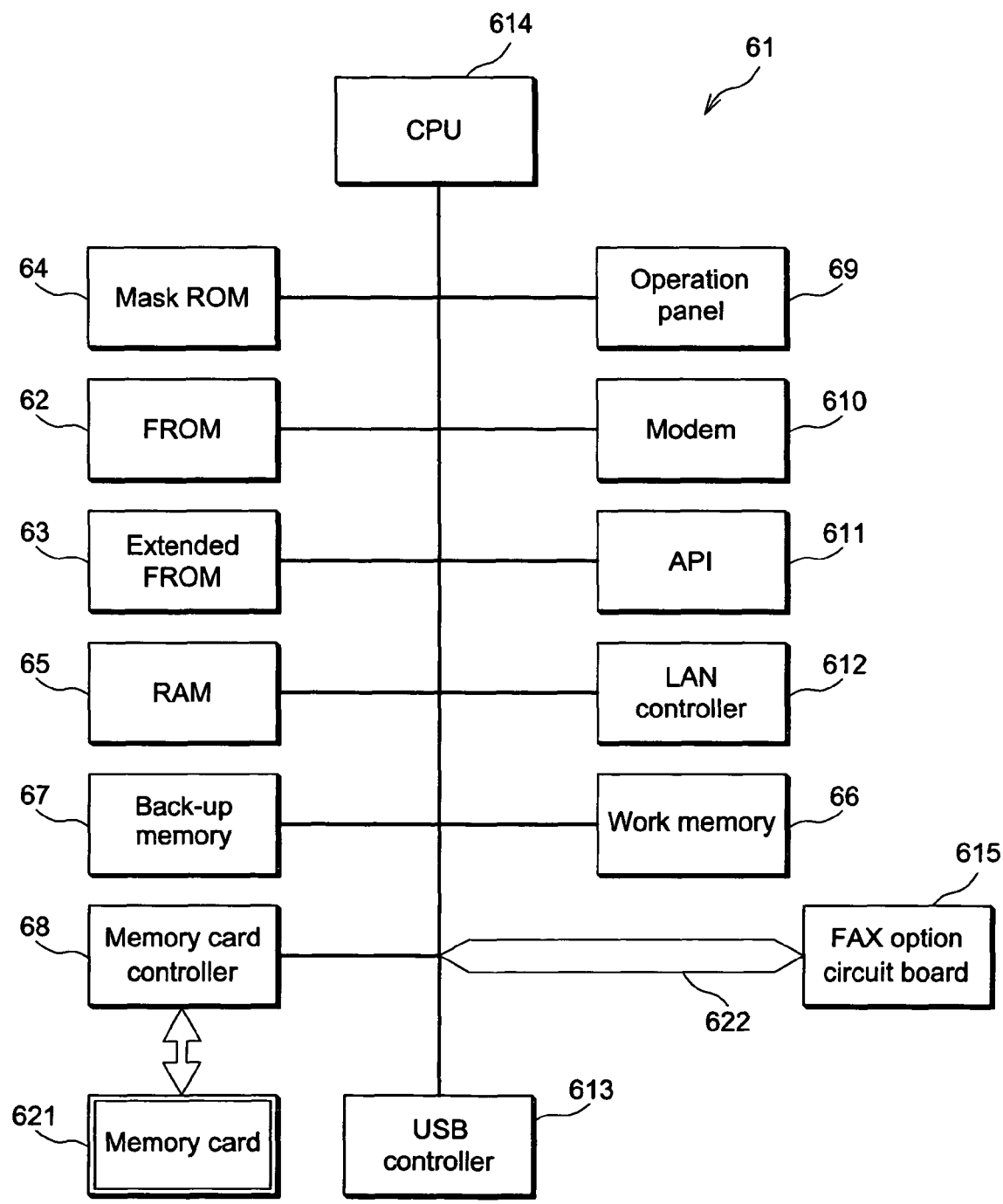
FIG. 6 is a block diagram illustrating a basic configuration of the image forming apparatus according to the second embodiment of the present invention.

FIG. 6 is a block diagram illustrating a basic configuration of the image forming apparatus of the present invention. Image forming apparatus 61 primarily comprises: FROM (Flash Read Only Memory) (memory) 62; extended FROM (memory) 63; Mask ROM 64; RAM (Random Access Memory) 65; work memory 66; backup memory 67; memory card controller (Interface) 68; operation panel 69; modem 610; API (Application Program Interface) 611; LAN (Local Area Network) controller 612; USB (Universal Serial Bus) controller 613; CPU (Central Processing Unit) (controller) 614; and FAX option circuit board 615. Although detailed embodiments are not explained here, image forming apparatus 61 further comprises hardware devices which function as a printer, scanner, and other apparatuses, in the same way as a general multifunction apparatus.

FROM 62 is a programming memory mounted on the circuit board of image forming apparatus 61 which can store a plurality of firmware programs. FROM 62 primarily stores standard firmware. Extended FROM 63 is a supplemental extended memory connected to the built-in terminal of image forming apparatus 61. Extended FROM 63 is used to supplement the capacity of FROM 62, for instance, when the capacity of FROM 62 is inadequate. Extended FROM 63 primarily stores optional firmware. Mask ROM 64 is a non-volatile memory in which firmware and other programs are pre-installed. Mask ROM 64 functions as a backup memory, and is used to perform an emergency start-up, when the firmware stored in such component as FROM 62 does not start up properly. In other words, Mask ROM 64 can be used to handle a problem caused, for instance, based on write-in errors on FROM 62 by pre-installing an old version of firmware in Mask ROM 64. RAM 65 is a temporary memory which has a domain where the firmware stored in such components as FROM 62 and as extended FROM 63 is performed. Work memory 66 has a domain to temporarily store updating firmware, when the firmware is updated. Backup memory 67 is a non-volatile memory which stores various registry information including firmware identifiers and firmware update dates.

Memory card controller 68 comprises a card slot which has a terminal to be connected to a predetermined memory card (portable memory) 621. Memory card controller 8 controls operations such as reading and writing of files on memory card 621 connected to the card slot. The memory card, in this example, is not limited to a particular platform. The memory card is applicable to various memories including a SD (Secure Digital) memory card or a Compact Flash (registered trademark).

Operation panel 69 comprises an operation key with which the operator can direct operations including the firmware update. Operation panel 69 also comprises a panel to display the operation status of image forming apparatus 61.

Modem 610 converts digital signals to analog signals and converts analog signals to digital signals. Modem 610 also communicates with other apparatuses via public telecommunications. API 611 provides a function for a port control. LAN controller 612 controls the network connection with the LAN.

USB controller 613 controls USB communications to reciprocally send and receive data with the PC or peripheral devices.

CPU 614 is a processing apparatus which comprehensively controls the operations of the above-described components of image forming apparatus 61. CPU 614 performs the firmware update according to predetermined updating programs.

FAX option circuit board 615 is an optional circuit board used to allow image forming apparatus 61 to function as a facsimile apparatus. FAX option circuit board 615 is connected to CPU 614 via II C bus 622.

In the above-described embodiment of image forming apparatus 61, the firmware updates can add new functions to and fix problems of each hardware device of image forming apparatus 61. Such firmware updates are performed by connecting the memory card which stores a plurality of updating firmware programs to the card slot of image forming apparatus 61.

FIG. 7 is a chart illustrating an example of the updating firmware stored in the memory card inserted to the image forming apparatus shown in FIG. 6. The updating firmware for a printer apparatus and a facsimile apparatus stored in memory card 621 is explained below.

As shown in FIG. 7, four updating firmware files for a printer apparatus are stored in memory card 621. File 001 is a standard firmware set for a standard-use printer. File 002-004 are sets of optional firmware which support an optional function PCL (Printer Control Language).

FROM 62 of image forming apparatus 61 stores the standard firmware as a basic specification. The operator may use the optional firmware as a substitute for the standard firmware, if so desired. Therefore, when image forming apparatus 61 is used as a basic specification, the standard firmware (file 001) is specified to be updated. When new functions for a printer apparatus are added, or when the optional firmware is already installed for extending functions of image forming apparatus 61, the optional firmware (file 002-004) is specified to be updated.

In this embodiment of image forming apparatus 61, FROM 62 is set as the storage location for the standard firmware (file 001) and for the PCL optional firmware (file 002). Extended FROM 63 is set as the storage location for the PCL optional firmware regarding the PCL control (file 003) and for the PCL optional firmware regarding the PCL fonts (file 004). Therefore, FROM 62 is specified as the transfer location for the standard firmware (file 001) and for PCL optional firmware (file 002). Extended FROM 63 is specified as the transfer location for the PCL optional firmware regarding PCL control (file 003) and for the PCL optional firmware regarding PCL fonts (file 004).

In the embodiment of the present invention, firmware programs are divided and stored in a plurality of memories (FROM 62, Extended FROM). However, it is not always necessary to have a plurality of memories. It is possible to store the entire firmware at once in a large capacity memory. The optional firmware which supports the optional printer function PCL, has been explained. Updating firmware are also available to enable other printer functions including PDL (page descriptive language).

Memory card 621 stores one type of updating firmware for a facsimile apparatus. FAX option circuit board firmware (file 010) is the optional firmware to extend facsimile communication functions. Installing the optional firmware makes it possible to store multiple-line control functions to handle multiple-line facsimile communications. In the embodiment of image forming apparatus 61, the FAX option circuit board firmware (file 010) is stored in the memory of FAX option circuit board 615. Therefore, FAX option circuit board 615 is specified as the transfer location for the FAX option circuit board firmware (file 010).

Figure 8:
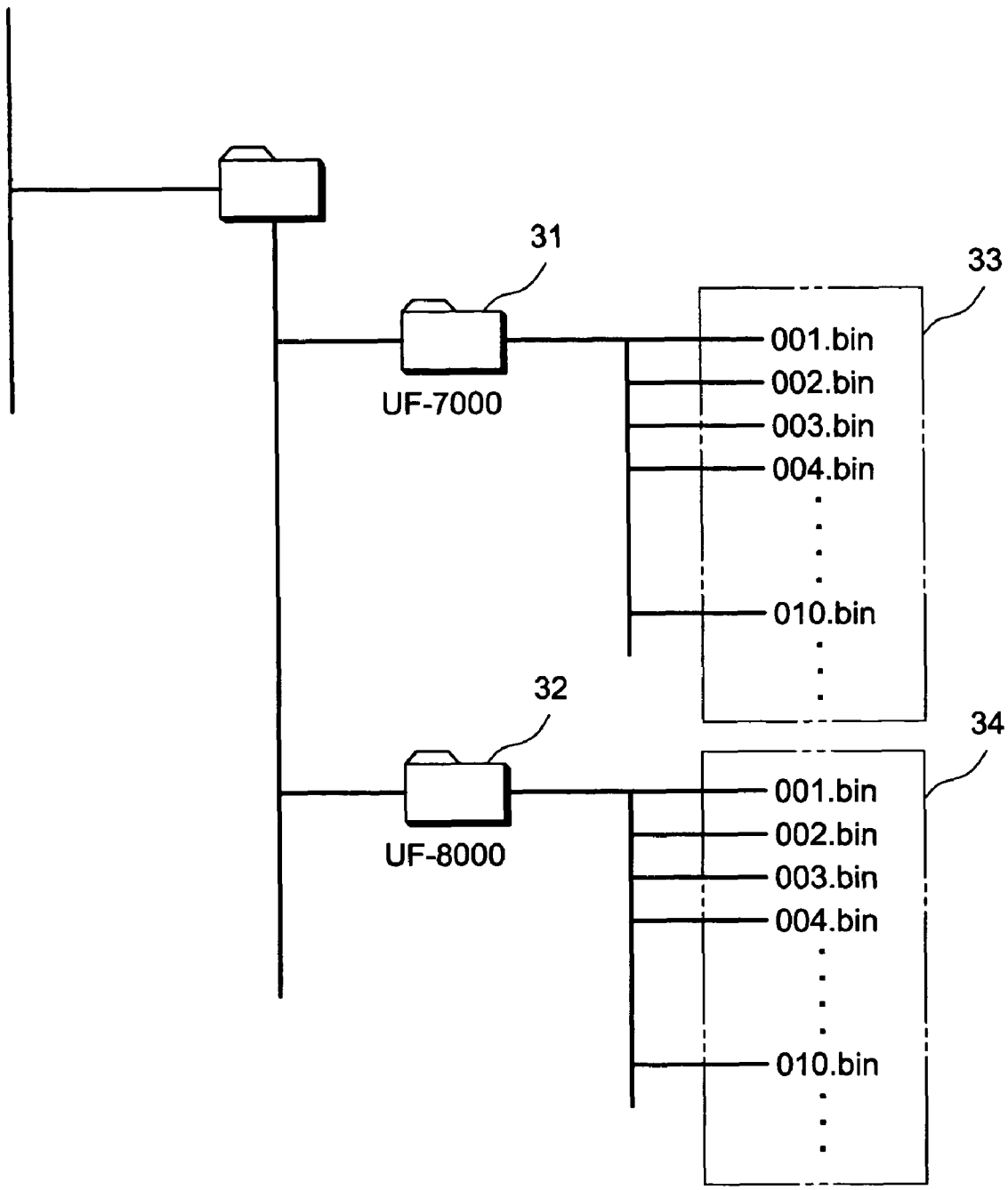
FIG. 8 is a chart illustrating a directory structure of files stored in the memory card inserted to the image forming apparatus shown in FIG. 6.

FIG. 8 is a chart illustrating a directory structure of files stored in the memory card inserted to the image forming apparatus shown in FIG. 6. Various updating firmware programs are stored in memory card 621, without being limited by the model or functions of the image forming apparatus. These updating firmware programs are categorized according to their storage location directories. In this embodiment of the present invention, the updating firmware are stored according to the respective model of the image forming apparatus.

In FIG. 8, directory 31 corresponds to the model 'UF-7000' of image forming apparatus 61. Binary files 33 (e.g., '001.bin'-'010.bin') of a plurality of updating firmware programs applicable to UF-7000 are stored in directory 31. These binary files include the firmware regarding optional functions which can be randomly chosen to extend the functions of predetermined hardware devices stored in image forming apparatus 61.

Similarly, directory 32 regarding another apparatus model corresponds to the model 'UF-8000'. Binary files 34 (e.g., '001.bin'-'010.bin') of a plurality of updating firmware programs applicable to UF-8000 are stored in directory 32.

The directory structure shown above is just an example. Various directory structures are possible for classifying and storing a plurality of updating firmware programs. The operator who executes the firmware updates may perform operations such as copying, deleting and transferring these updating firmware files, if necessary, by using a general-use file management software program.

Figure 9:
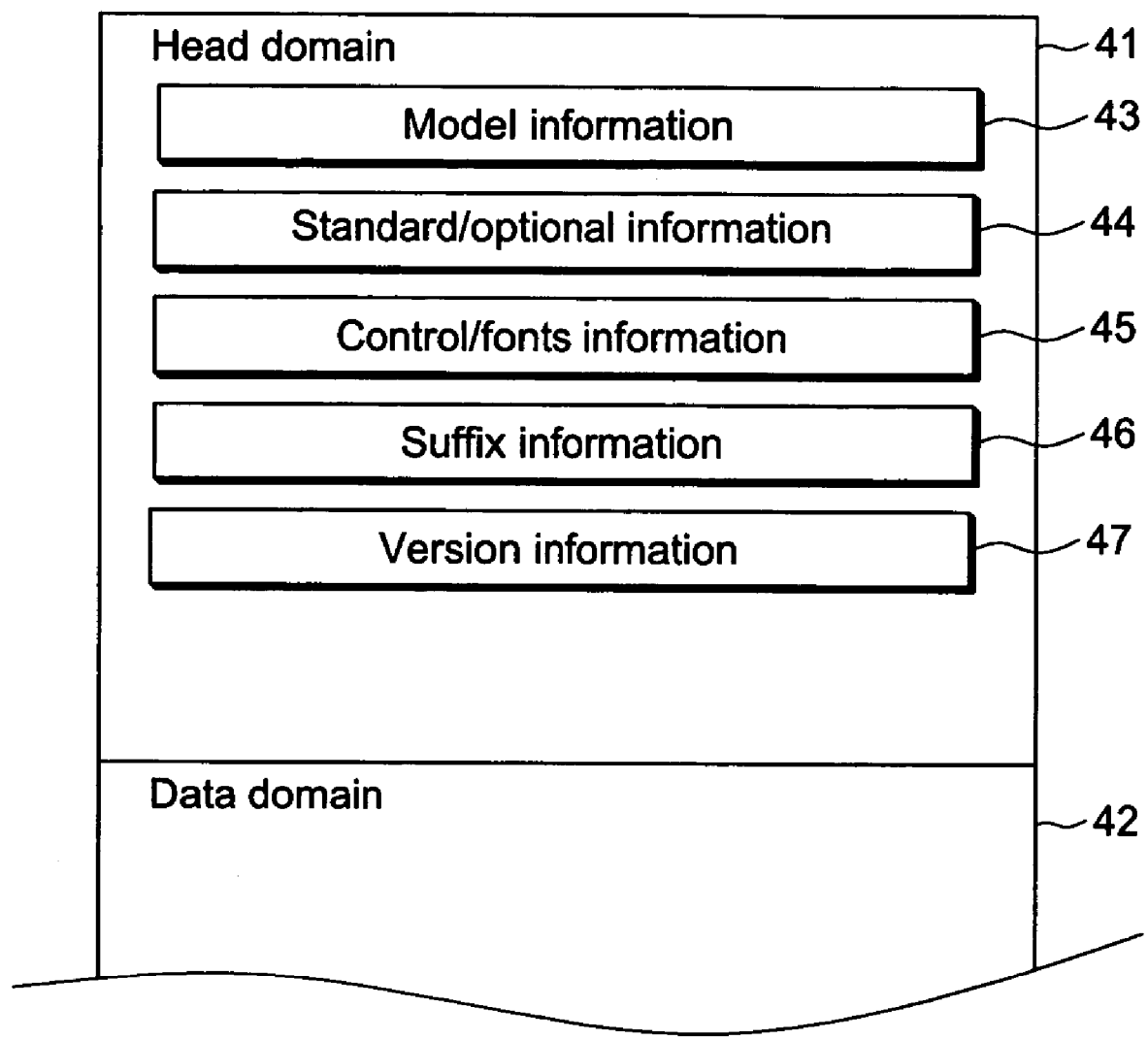
FIG. 9 is a chart illustrating a basic internal structure of the updating firmware file shown in FIG. 8.

FIG. 9 is a chart illustrating a basic internal structure of the updating firmware file shown in FIG. 8. The updating firmware file primarily comprises header domain 41 and data domain 42.

Header domain 41 can record various information to determine whether the updating firmware is applicable to image forming apparatus 61, and to determine where to store the updating firmware. In this example, as binary form data, header domain 41 primarily records: (1) information on the apparatus model which is applicable to the updating firmware (model information 43); (2) information to determine whether the updating firmware is for standard-use or for optional-use (e.g., File 001 or one of files 002-004 shown in FIG. 2) (standard/optional information 44); (3) information to determine whether the updating firmware is for control use or fonts use (control/fonts information 45); (4) suffix information for the updating firmware (suffix information 46); and (5) information on the updating firmware version (version information 47). Similarly, header domain 42 records such information as procedures, orders and fonts data to control the operations of image forming apparatus 61.

Figure 10:
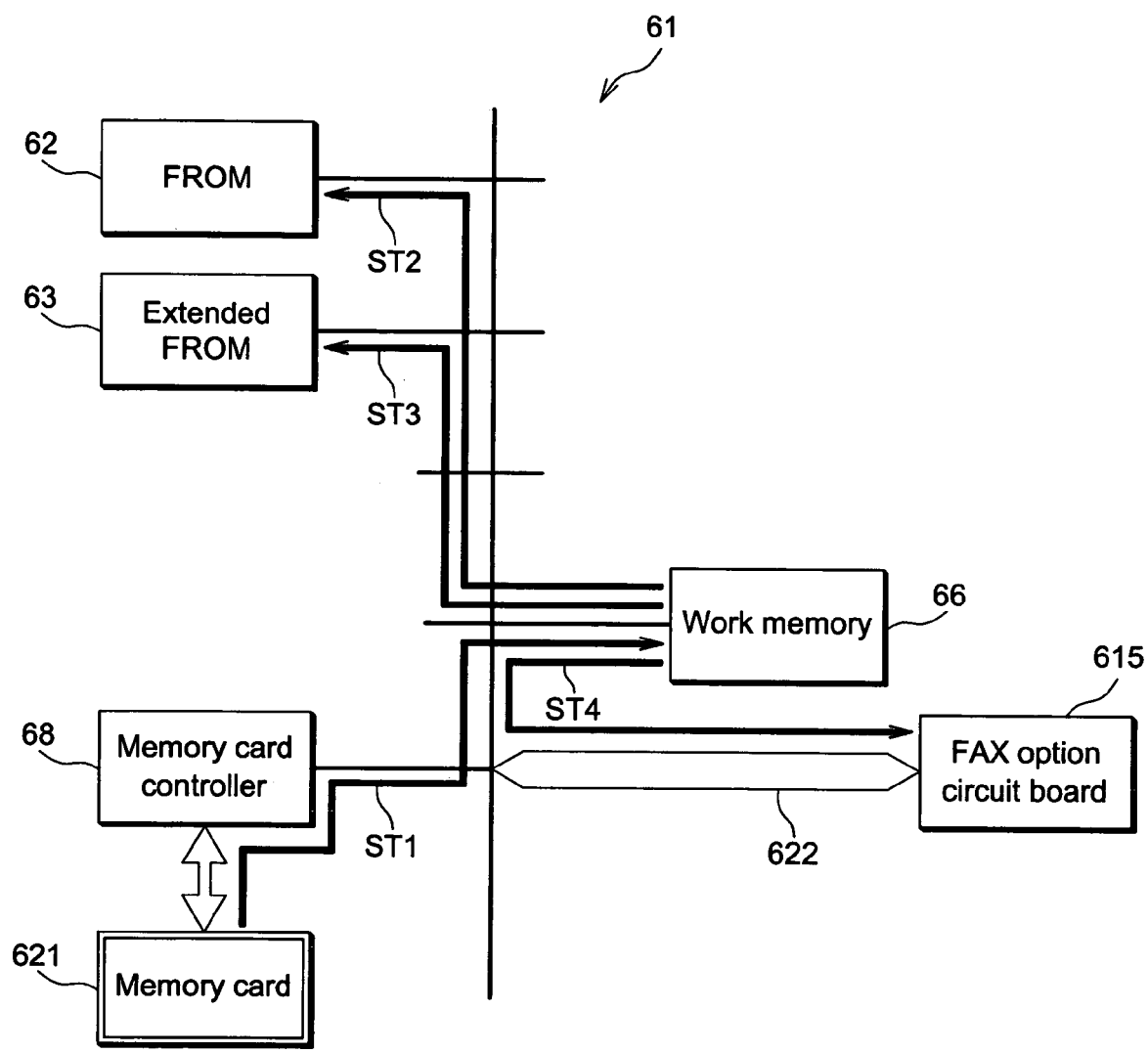
FIG. 10 is a data flowchart of the updating firmware between the image forming apparatus shown and the memory card in FIG. 6.

FIG. 10 is a data flowchart of the updating firmware between the image forming apparatus and the memory card show in FIG. 6. When the firmware is updated, the updating firmware files stored in memory card 621 inserted to image forming apparatus 61 are read by memory card controller 68, and the updating firmware files are temporarily stored in work memory 66 (ST 1). Then, the performed updating firmware files are analyzed, and the information recorded in the header domain (e.g., models, contents, and versions which are applicable to the updating firmware) is obtained.

Image forming apparatus 61 determines whether the specified updating firmware is necessary or not, and selects the storage location by referring to the above-described updating firmware information and by referring to the information regarding the firmware already stored in image forming apparatus 61. In this example, the information regarding firmware stored in FROM 62, extended FROM 63, and FAX option circuit board 615 is referred.

If FROM 2 is specified as the storage location for the updating firmware, data in FROM 62 is deleted. Then, data in the updating firmware is transferred to and written in FROM 62 (ST 2). If extended FROM 63 is specified as the storage location for the updating firmware, data in a predetermined area of extended FROM 63 is deleted. Then, data in the updating firmware is transferred to and written in the predetermined area of extended FROM 63 (ST 3). If FAX option circuit board 615 is specified as the storage location for the updating firmware, data in the updating firmware is transferred to extended FAX option circuit board 615 via IIC bus 622, and is written in extended FAX option circuit board 615 (ST 4).

Figure 11:
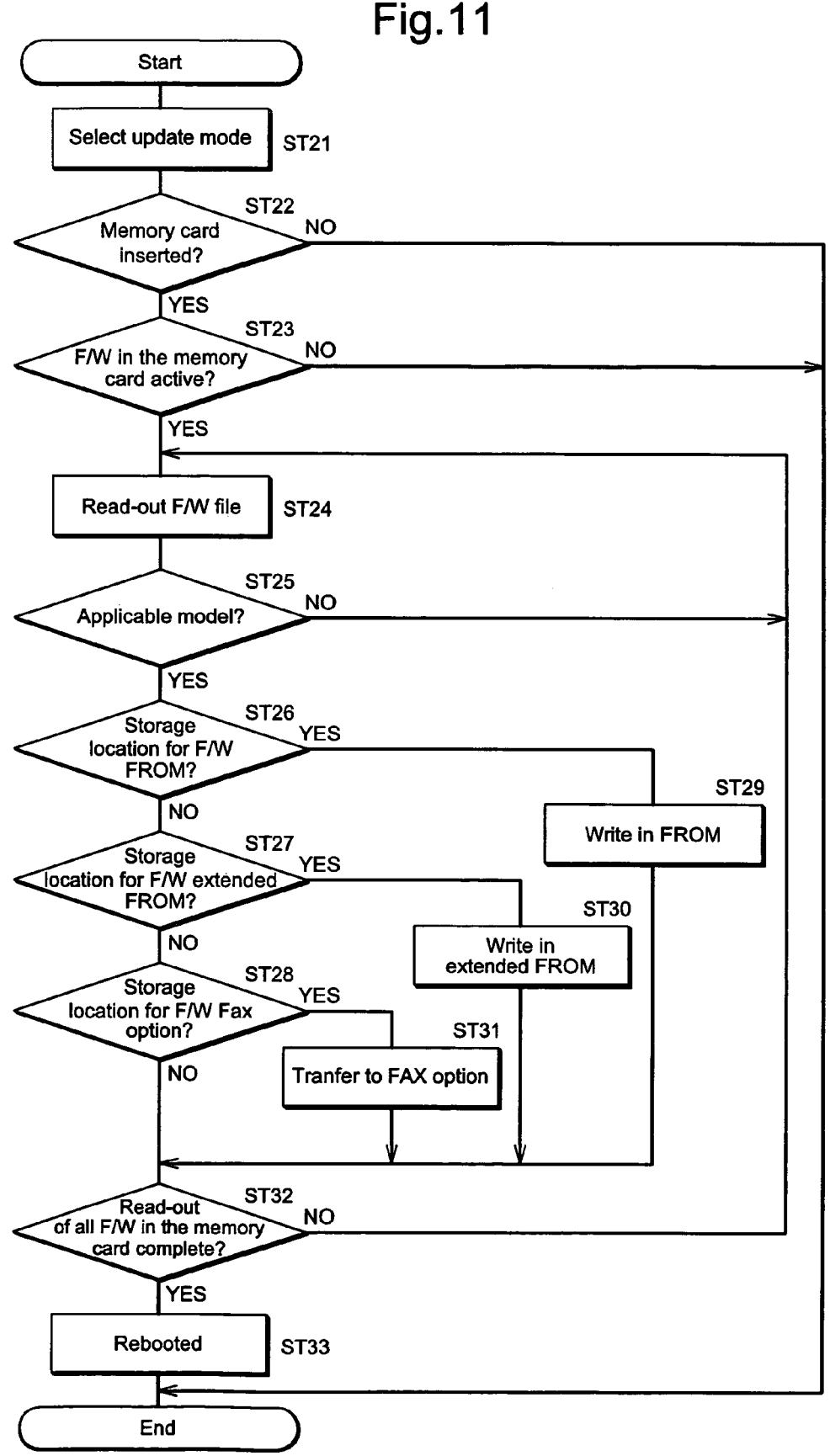
FIG. 11 is a flowchart illustrating a firmware update process performed on the image forming apparatus shown in FIG. 6.

FIG. 11 is a flowchart illustrating a firmware update process performed on the image forming apparatus shown in FIG. 6. When a firmware (F/W) update mode is executed, the operator selects an update mode (ST 21). In this example, either the "automatic mode" or the "individual select mode" may be selected. In the "automatic mode", image forming apparatus 61 automatically selects all updating firmware programs which may be updated; in the "individual select mode", only firmware programs which need to be updated are selected individually from all updating firmware programs which may be updated and selected by image forming apparatus 61. In other words, if the automatic mode is selected, all applicable firmware programs in memory card 621 may be updated. If the individual select mode is selected, only updating firmware selected by the operator may be updated.

Secondly, when memory card 621 is confirmed to be inserted to the card slot of image forming apparatus 61 (ST 22: Yes), it is determined whether the updating firmware stored in memory card 621 are active (ST 23). This is confirmed by first searching in memory card 621 for all model folders applicable to the apparatus which needs the firmware updates. Then, if appropriate folders are found, it is determined whether the folders contain active updating firmware. In this example, the model of image forming apparatus 61 is "UF-7000" (as described below). Search takes place in folder 31 in the file structure shown in FIG. 8. Then, it is determined whether the file (e.g., 001.bin) contained in folder 31 is active.

If it is determined that the updating firmware is active (ST 23: Yes), one of the updating firmware files is read, and temporarily stored in work memory 66 (ST 24). If the individual select mode is selected at this time, only files of the updating firmware selected by the operator through an input operation on operation panel 69 may be read. Then, based on the apparatus model information recorded in header domain 42 of the updating firmware file, it is determined whether image forming apparatus 61 is among the models to which the read-out updating firmware files are applicable (ST 25). At this time, the model information of image forming apparatus 61 may be recorded in a predetermined domain of FROM 62 and MASK ROM 64. If it is determined that UF-7000 is not applicable to the updating firmware, the process returns to step ST 24, and an file read-out for the next available updating firmware is executed. Through this process, even if there is an inappropriate updating file in folder 31 of memory card 621, it is possible to prevent the updating process from being executed with the inappropriate file.

If it is determined at Step ST 25 that UF-7000 is applicable to the updating firmware, an appropriate storage location for the updating firmware is selected from among FROM 62, extended FROM 63 and FAX option circuit board 615 in this order (ST 26-ST 28). When the storage location is determined, the updating firmware is transferred, and is written in the selected storage location (ST 29-ST 31).

When the write-in process in the storage location is completed, or when the appropriate storage location is not found (ST 28: No), it is determined whether the read-out of all updating firmware programs which may be updated in memory card 621 has been completed (ST 32). If the read-out of all updating firmware programs has not been completed, the above-described steps ST 24-ST 31 are repeated, until the read-out process is completed. When the read-out process for all updating firmware programs is finally completed (ST 32: Yes), a reboot operation is executed to activate newly written-updating firmware programs (ST 33). This completes the firmware update.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application Nos. 2003-432696 filed on Dec. 26, 2004 and 2004-257606 filed on Sep. 3, 2004, entire content of which is expressly incorporated by reference herein.

What is claimed is:

1. A multifunctional image forming apparatus comprising:
a memory configured to store firmware;
an interface configured to be connected to an external terminal apparatus via a network; and
a controller configured to receive, from the external terminal apparatus, an instruction for updating the firmware stored in the memory, to receive a plurality of specified updating firmware corresponding to the firmware stored in the memory, and to store the plurality of specified updating firmware in the memory,
the controller, when the plurality of the specified updating firmware are received, being further configured to store each of the plurality of the specified updating firmware in the memory without rebooting the multifunctional image forming apparatus each time one of the plurality of the specified updating firmware is stored in the memory, and to automatically reboot the multifunctional image forming apparatus, when the controller receives, from the external terminal computer, an ending file that informs the image forming apparatus of the completion of transferring all specified updating firmware, and
the controller, during the receiving of the specified updating firmware, determining if a reception error has occurred indicating a communication failure with the external terminal apparatus, and determining if a time out has occurred indicating that the reception of the specified updating firmware is incomplete over a predetermined time period, the controller displaying an error message on a display of the multifunctional image forming apparatus when at least one of a reception error and a time out has occurred;

wherein the specified updating firmware includes standard firmware and optional firmware, the optional firmware extending functions of the multifunctional image forming apparatus, and wherein the instruction for updating the specified firmware includes specific instructional information designating which standard firmware and which optional firmware of the plurality of specified updating firmware are to be executed.

2. The multifunctional image forming apparatus according to claim 1, wherein the interface is configured, based on a standard for a universal serial bus.

3. The multifunctional image forming apparatus according to claim 1, wherein the interface comprises a local area network interface.

4. The multifunctional image forming apparatus according to claim 1, wherein the external terminal apparatus comprises a personal computer.

5. The multifunctional image forming apparatus according to claim 1, further comprising a printer configured to print data, wherein the firmware stored in the memory comprises firmware for the printer, and wherein the plurality of specified updating firmware includes standard printer firmware, optional printer firmware that supports printer command language, and optional printer firmware that supports both post script and printer command language.

6. A multifunctional image forming apparatus, comprising:

a memory configured to store firmware;

an interface configured to be connected to an external terminal apparatus via a network; and a controller configured to receive, from the external terminal apparatus, an instruction for updating the firmware stored in the memory, to receive a plurality of specified updating firmware corresponding to the firmware stored in the memory, and to store the plurality of specified updating firmware in the memory, the controller, when the plurality of the specified updating firmware are received, being further configured to store each of the plurality of the specified updating firmware in the memory without rebooting the multifunctional image forming apparatus, and to automatically reboot the multifunctional image forming apparatus, when the controller receives, from the external terminal computer, a completion instruction indicating a completion of transmitting the specified updating firmware;

wherein the completion instruction comprises a text file, the text file including characters indicating a fulfillment of transmitting the specified updating firmware from the external computer terminal, wherein the specified updating firmware includes standard firmware and optional firmware, the optional firmware extending functions of the multifunctional image forming apparatus, and wherein the instruction for updating the firmware includes specific instructional information designating which standard firmware and which optional firmware of the plurality of specified updating firmware are to be executed.

7. The multifunctional image forming apparatus according to claim 6, wherein the interface is configured, based on a standard for a universal serial bus.

8. The multifunctional image forming apparatus according to claim 6, wherein the interface comprises a local area network interface.

9. The multifunctional image forming apparatus according to claim 6, wherein the external terminal apparatus comprises a personal computer.

10. The multifunctional image forming apparatus according to claim 6, further comprising a printer configured to print data, wherein the firmware stored in the memory comprises firmware for the printer; and wherein the plurality of specified updating firmware includes standard printer firmware, optional printer firmware that supports printer command language, and optional printer firmware that supports both post script and printer command language.

11. An updating method for updating firmware in a multifunctional image forming apparatus, the multifunctional image forming apparatus having a memory configured to store firmware and having an interface configured to be connected to an external terminal apparatus via a network, the updating method comprising:

receiving, from the external terminal apparatus, an instruction for updating the firmware stored in the memory;

receiving a plurality of specified updating firmware corresponding to the firmware stored in the memory;

during the receiving of the plurality of specified updating firmware, determining if a reception error has occurred indicating a communication failure with the external terminal apparatus, and determining if a time out has occurred indicating that the reception of the specified updating firmware is incomplete over a predetermined time period, the multifunctional image forming apparatus displaying an error message on a display when at least one of a reception error and a time out has occurred;

storing the plurality of the specified updating firmware in the memory, without rebooting the multifunctional image forming apparatus each time one of the plurality of the specified updating firmware is stored in the memory, when the plurality of the specified updating firmware are received; and automatically rebooting the multifunctional image forming apparatus when an ending file that informs the image forming apparatus of the completion of transferring all specified updating firmware is received from the external terminal apparatus, wherein the specified updating firmware includes standard firmware and optional firmware, the optional firmware extending functions of the multifunctional image forming apparatus, and wherein the instruction for updating the firmware includes specific instructional information designating which standard firmware and which optional firmware of the specified plurality of updating firmware are to be executed.

12. An updating method for updating firmware in a multifunctional image forming apparatus, the multifunctional image forming apparatus having a memory configured to store firmware and having an interface configured to be connected to an external terminal apparatus via a network, the updating method comprising:

receiving, from the external terminal apparatus, an instruction for updating the firmware stored in the memory;

receiving a plurality of specified updating firmware corresponding to the firmware stored in the memory;

storing the plurality of the specified updating firmware in the memory, without rebooting the multifunctional image forming apparatus each time one of the plurality of the specified updating firmware is stored in the memory, when the plurality of the specified updating firmware are received; and automatically rebooting the multifunctional image forming apparatus when a completion instruction indicating a completion of transmitting the specified updating firmware are received from the external terminal computer, wherein the completion instruction comprises a text file, the text file including characters indicating a fulfillment of transmitting the specified updating firmware from the external computer terminal, wherein the updating firmware includes standard firmware and optional firmware, the optional firmware extending functions of the multifunctional image forming apparatus, and wherein the instruction for updating the firmware includes specific instructional information designating which standard firmware and which optional firmware of the plurality of updating firmware are to be executed.

13. A multifunctional image forming apparatus comprising:

a memory configured to store firmware, the memory having designated sections including a first section that primarily stores standard firmware, a second section that primarily stores optional firmware, a third section that stores preinstalled firmware that functions as a backup memory and is used to perform emergency start-up, a fourth section that temporarily stores updating firmware when the firmware is updated, and a fifth section that stores registry information including firmware identifiers and firmware update dates;

an interface configured to be connected to a portable memory medium, the portable memory medium storing a plurality of folders of updating firmware, each of the plurality of the folders of the updating firmware corresponding to each of a plurality of models of the multifunctional image forming apparatus, each of the plurality of the folders of the updating firmware including a plurality of the updating firmware;

an operation panel used by a operator to control execution of the updating firmware through a selection of one of at least two operator selectable modes, including an automatic mode in which all updating firmware are executed, and an individual select mode in which only specified updating firmware selected by the operator are executed, the individual select mode also permitting the operator to perform additional operations, including copying, deleting, and transferring specified updating firmware, and a controller, when the portable memory medium is connected to the multifunctional image forming apparatus, is configured:

to determine whether the updating firmware stored in the portable memory medium are active, by searching in the portable memory medium for all model folders applicable to the multifunctional image forming apparatus, to determine whether a predetermined model of the multifunctional image forming apparatus is among the models to which active updating firmware files are applicable, based on multifunctional image forming apparatus model information recorded in a header domain of an updating firmware file, to select a folder of the updating firmware corresponding to the predetermined model of the multifunctional image forming apparatus from the portable memory medium, based on folder information indicating the predetermined model of the multifunctional image forming apparatus for each of the plurality of folders of the updating firmware, the folder information being included in each of the plurality of folders of the updating firmware, to store the plurality of firmware included in the selected folder of the updating firmware in the designated section of the multifunctional image forming apparatus memory, without rebooting the multifunctional image forming apparatus each time one of the plurality of pieces of the updating firmware is stored in the memory, and to reboot the multifunctional image forming apparatus after all of the plurality of pieces of the updating firmware corresponding to the predetermined model of the multifunctional image forming apparatus are stored in the multifunctional image forming apparatus memory.

14. The multifunctional image forming apparatus according to claim 13, wherein the memory comprises a plurality of separate memories, each separate memory having a designated purpose, the portable memory medium stores destination information indicating in which separate memory each of the plurality of pieces of the updating firmware is stored, and the controller stores each of the plurality of pieces of the updating firmware in the separate memory which the destination information indicates for each of the plurality of pieces of the updating firmware.

15. The multifunctional image forming apparatus according to claim 13, wherein the updating firmware comprises firmware for an optional function, the optional function extending functions of the multifunctional image forming apparatus.

16. The multifunctional image forming apparatus according to claim 15, wherein the optional function comprises a printing function using a page description language.

17. The multifunctional image forming apparatus according to claim 15, wherein the optional function comprises a control function for controlling multiple-lines, the multiple-lines being utilized for a facsimile communication.

18. An updating method for updating firmware in a multifunctional image forming apparatus, the multifunctional image forming apparatus having a memory configured to store firmware, the memory having designated sections including a first section that primarily stores standard firmware, a second section that primarily stores optional firmware, a third section that stores preinstalled firmware that functions as a backup memory and is used to perform emergency start-up, a fourth section that temporarily stores updating firmware when the firmware is updated, and a fifth section that stores registry information including firmware identifiers and firmware update dates, and having an interface configured to be connected to a portable memory medium, the portable memory medium storing a plurality of folders of updating firmware, each of the plurality of the folders of the updating firmware corresponding to each of a plurality of model of the multifunctional image forming apparatus, each of the plurality of the folders of the updating firmware including a plurality of the updating firmware, the updating method comprising:

selecting one of at least two operator selectable modes, including an automatic mode in which all updating firmware are executed, and an individual select mode in which only specified updating firmware selected by the operator are executed, the individual select mode also permitting the operator to perform additional operations, including copying, deleting, and transferring specified updating firmware, connecting the portable memory medium to the multifunctional image forming apparatus;

determining whether the updating firmware stored in the portable memory medium are active, by searching in the portable memory medium for all model folders applicable to the multifunctional image forming apparatus;

determining whether a predetermined model of the multifunctional image forming apparatus is among the models to which active updating firmware files are applicable, based on multifunctional image forming apparatus model information recorded in a header domain of an updating firmware file;

selecting a folder of the updating firmware corresponding to the predetermined model of the multifunctional image forming apparatus from the portable memory medium, based on folder information indicating the predetermined model of the multifunctional image forming apparatus for each of the plurality of folders of the updating firmware, the folder information being included in each of the plurality of folders of the updating firmware storing the plurality of firmware included in the selected group of the updating firmware, without rebooting the multifunctional image forming apparatus each time one of the plurality of pieces of the updating firmware is stored in a designated section of the memory; and rebooting the multifunctional image forming apparatus after all of the plurality of the updating firmware corresponding to the predetermined model of the multifunctional image forming apparatus are stored in the memory.

\* \* \* \* \*